US010601962B2

(12) United States Patent
Schmidtke et al.

(10) Patent No.: US 10,601,962 B2
(45) Date of Patent: \*Mar. 24, 2020

(54) TRANSMITTING DATA OVER A PLURALITY OF DIFFERENT NETWORKS

(71) Applicant: WILMERDING COMMUNICATIONS LLC, San Antonio, TX (US)

(72) Inventors: Jakub Schmidtke, Waterloo (CA); Paul Ward, Waterloo (CA)

(73) Assignee: CTH Lending Company, LLC, Pittsburgh, PA (US)

(\*) Notice: Subject to any disclaimer, the term of this patent is extended or adjusted under 35 U.S.C. 154(b) by 688 days.

This patent is subject to a terminal disclaimer.

(21) Appl. No.: 14/168,801

(22) Filed: Jan. 30, 2014

(65) Prior Publication Data

US 2014/0146807 A1 May 29, 2014

Related U.S. Application Data

(63) Continuation of application No. 13/156,923, filed on Jun. 9, 2011, now Pat. No. 8,644,816.

(60) Provisional application No. 61/352,980, filed on Jun. 9, 2010.

(51) Int. Cl.
*H04L 29/06* (2006.01)
*H04L 29/08* (2006.01)
*H04W 80/06* (2009.01)

(52) U.S. Cl.
CPC ...... *H04L 69/163* (2013.01); *H04L 29/08846* (2013.01); *H04W 80/06* (2013.01)

(58) Field of Classification Search
CPC ........ H04W 80/06; H04L 1/18; H04L 69/163; H04L 29/08846
USPC ......................................................... 370/338
See application file for complete search history.

(56) References Cited

U.S. PATENT DOCUMENTS

| | | | | |
|---|---|---|---|---|
| 5,673,322 A | \* | 9/1997 | Pepe | H04L 63/02 705/52 |
| 5,850,602 A | \* | 12/1998 | Tisdale | H04B 7/18567 455/430 |
| 6,091,733 A | \* | 7/2000 | Takagi | H04L 47/10 370/401 |
| 6,175,876 B1 | \* | 1/2001 | Branson | G06F 9/542 707/999.103 |

(Continued)

FOREIGN PATENT DOCUMENTS

| | | |
|---|---|---|
| JP | 2004-533138 | 10/2004 |
| JP | 2009-296084 | 12/2009 |
| KR | 10-2006-0082732 | 7/2006 |

*Primary Examiner* — Christine Ng
(74) *Attorney, Agent, or Firm* — Osha Liang LLP

(57) ABSTRACT

A method for transmitting data from a mobile communication device to a remote server across a wireless network is described. The method comprising the following steps. Data is transmitted from an application executing on the mobile communication device using a standard reliable communication protocol. Prior to transmitting the data across the wireless network, receipt of the data is acknowledged, thereby simulating, to the application, receipt of the data by the remote server. Data is transmitted from the mobile communication device to the remote server using an intermediary communication protocol. A mobile communication device and a system implementing the method are also described.

19 Claims, 4 Drawing Sheets

(56) References Cited

U.S. PATENT DOCUMENTS

| | | | | |
|---|---|---|---|---|
| 6,324,564 | B1* | 11/2001 | Thielke | H04W 28/06 709/202 |
| 6,359,882 | B1* | 3/2002 | Robles | H04L 1/1854 370/389 |
| 6,480,901 | B1* | 11/2002 | Weber | H04L 41/0213 709/223 |
| 7,054,618 | B1* | 5/2006 | McCullough | 455/414.1 |
| 7,197,571 | B2* | 3/2007 | Sarkar | G06F 11/1464 370/230 |
| 8,090,859 | B2* | 1/2012 | Shah | H04L 69/16 709/230 |
| 8,644,816 | B2* | 2/2014 | Schmidtke | H04L 69/163 455/426.1 |
| 2002/0067599 | A1 | 6/2002 | Mann | |
| 2002/0085516 | A1* | 7/2002 | Bridgelall | H04W 36/04 370/329 |
| 2003/0004955 | A1* | 1/2003 | Cedola | G06F 11/2082 |
| 2003/0069926 | A1* | 4/2003 | Weaver | G06F 16/9574 709/203 |
| 2003/0229900 | A1* | 12/2003 | Reisman | 725/87 |
| 2003/0235206 | A1 | 12/2003 | Heller | |
| 2004/0071122 | A1* | 4/2004 | Svensson | H04L 67/327 370/338 |
| 2005/0213586 | A1* | 9/2005 | Cyganski | H04L 41/0896 370/395.41 |
| 2006/0068777 | A1* | 3/2006 | Sadowsky et al. | 455/427 |
| 2007/0070948 | A1* | 3/2007 | Kezys | H04L 12/6418 370/331 |
| 2009/0019505 | A1* | 1/2009 | Gopalakrishnan | H04L 1/0001 725/109 |
| 2012/0185569 | A1* | 7/2012 | Das et al. | 709/219 |

\* cited by examiner

TRANSMITTING DATA OVER A PLURALITY OF DIFFERENT NETWORKS

The present invention relates generally to communication between a mobile communication device and a server and specifically to configuring a communication protocol to provide improved communication between the wireless device and the server, especially when the wireless device is using two or more different communication interfaces. This application is a continuation of U.S. patent application Ser. No. 13/156,923 filed Jun. 9, 2011, which claims priority from U.S. Provisional Application No. 61/352,980, filed Jun. 9, 2010.

BACKGROUND

The proliferation of the Internet, portable communication devices and wireless networks has lead to the widespread use of communication devices capable of transmitting data as well as voice signals over the air. Most of the communication devices being manufactured provide at least two different wireless technologies to transmit the data; Wireless Wide Area Network (WWAN) technology and Wireless Local Area Network (WLAN) technology.

An example of a WWAN is cellular technology. Initially cellular service providers provided different data packet radio technology depending on the infrastructure they had already established. For example, cellular service providers running on a Code Division Multiple Access (CDMA) infrastructure introduced Evolution-Data Optimized (EV-DO) to provide data packet transfer. Cellular providers running on a Global System for Mobile Communications (GSM) infrastructure introduced General Packet Radio Service (GPRS) to provide data packet transfer. Currently, the GSM and CDMA infrastructures are running 3G standards. However, as the technology evolves, it appears as if most cellular service providers are moving towards the fourth generation of radio technologies, referred to as Long Term Evolution (LTE). It is expected the cellular technologies will continue to advance and evolve. However, cellular technology is still in its relative infancy and access to bandwidth is still relatively expensive and slow.

An example of a WLAN is Wi-Fi, which was developed by the Wi-Fi Alliance. Wi-Fi allows local area networks (LANs) to be deployed without wires for client devices, typically reducing the costs of network deployment and expansion. Spaces where cables cannot be run, such as outdoor areas and historical buildings, can host WLANs. Therefore, portable devices such as notebook computers, video game consoles, mobile phones and personal digital assistants can connect to the Internet when within range of a WLAN connected to the Internet. Using Wi-Fi typically provides relatively inexpensive access to bandwidth. However, Wi-Fi networks have limited range.

Accordingly, performance of the communication device can be improved by enabling it to communicate using multiple communication interfaces, including WWAN and WLAN, at the same time. Thus, the bandwidth available to the communication device is increased when compared to using only one communication interface at a time. An example of such a solution is described in PCT Publication Number WO/2010/063119 titled "MULTI-TRANSPORT MODE DEVICES HAVING IMPROVED DATA THROUGHPUT".

Applications executing on the communication device use a reliable protocol, such as Transmission Control Protocol (TCP), to communicate data packets, to a server. One of the benefits of using TCP is that it can automatically detect problems and adjust its transmission rate accordingly. For example, traditional TCP implements a network congestion algorithm that reduces the transmission rate when it detects dropped data packets. As the transmission continues without dropping data packets, the transmission rate slowly increases until the maximum rate or the next dropped packets are detected.

While TCP works well for wired networks, over wireless networks data packets are often dropped for reasons other than network congestion. Regardless, however, this drop of data packets will result in the invocation of the TCP congestion control algorithm, even though there may be no congestion on the network. This results in an unnecessary slow down in the transfer of the data packets, which is undesirable.

In order to overcome this problem, a scheme referred to as indirect TCP has been proposed, and is described in Ajay Bakre and B. R. Badrinath, "I-TCP: Indirect TCP for mobile hosts, 1995". However, the indirect TCP solution is proposed for wireless communication over a single communication interface. For communication devices that communicate over a plurality of different communication interfaces, indirect TCP is inadequate as it does not allow data to be transmitted using multiple interfaces in parallel.

Accordingly, it is an object of the present invention to obviate or mitigate at least some of the above mentioned disadvantages.

SUMMARY

In accordance with an aspect of the present invention there is provided a mobile communication device configured to transmit data to a remote server, the mobile communication device comprising: a wireless communication interface for communicating across a wireless network; a processor for executing computer-readable instructions; and memory for storing the computer-readable instructions, the computer-readable instructions operable to: transmit data from an application executing on the mobile communication device using a reliable communication protocol; prior to transmitting the data across the wireless network, acknowledge receipt of the data via a client protocol controller, thereby simulating, to the application, receipt of the data by the remote server; and transmit data from the mobile communication device to the remote server using an intermediary communication protocol.

In accordance with a further aspect of the present invention there is provided a method for transmitting data from a mobile communication device to a remote server across a wireless network, the method comprising the steps of: transmitting data from an application executing on the mobile communication device using a standard reliable communication protocol; prior to transmitting the data across the wireless network, acknowledging receipt of the data, thereby simulating, to the application, receipt of the data by the remote server; and transmitting data from the mobile communication device to the remote server using an intermediary communication protocol.

In accordance with yet a further aspect of the present invention there is provided a system configured to exchange data between a mobile communication device and a remote server via a proxy server, wherein: the remote server is configured to communicate using a reliable transmission protocol; the mobile communication device comprises: a wireless communication interface for communicating across a wireless network; a processor for executing computer-readable instructions; and memory for storing the computer-readable instructions, the computer-readable instructions operable to: exchange data between an application and a client protocol controller using a standard reliable communication protocol; exchange the data with the proxy server using an intermediary communication protocol; the proxy server comprises: a communication interface for communicating across the wireless network; a processor for executing computer-readable instructions; and memory for storing the computer-readable instructions, the computer-readable instructions operable to: exchange the data with the mobile communication device using the intermediary communication protocol; and exchange the data with the remote server via the server protocol controller using the standard reliable communication protocol.

BRIEF DESCRIPTION OF THE DRAWINGS

Embodiments of the present invention will now be described by way of example only with reference to the following drawings in which.

DETAILED DESCRIPTION OF THE PREFERRED EMBODIMENTS

Figure 1:
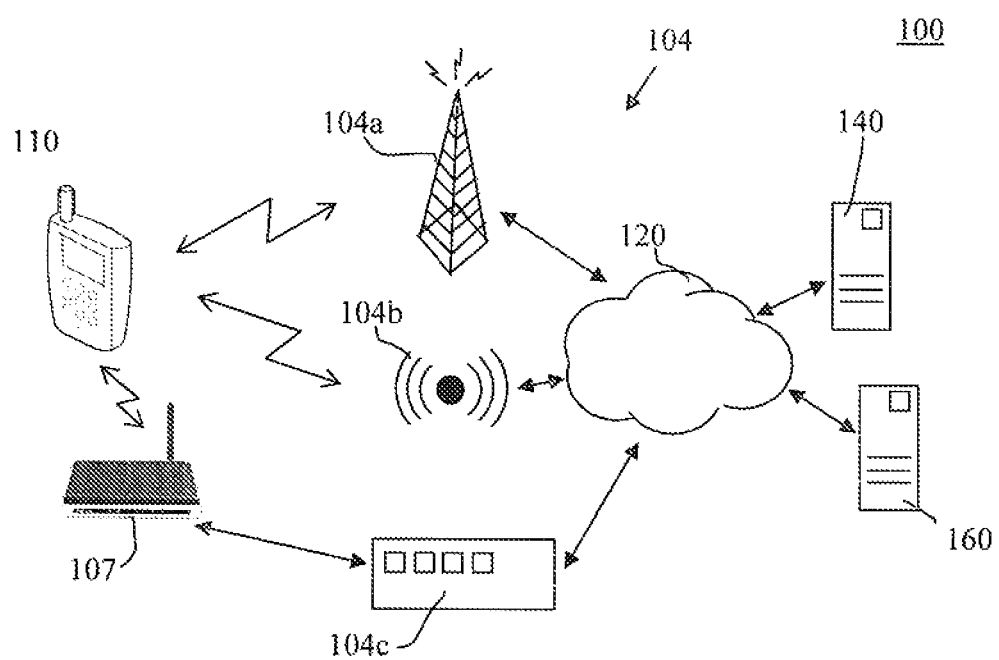
FIG. 1 is a block diagram of a network in accordance with an embodiment of the present invention.

For convenience like numerals in the description refer to like structures in the drawings. Referring to FIG. 1 a block diagram illustrating a network in accordance with an embodiment of the present invention is illustrated generally by numeral 100.

The network 100 includes a mobile communication device 110, a communication network 104, a proxy server 140 and a remote server 160. Both the mobile communication device 110 and the remote server 160 execute applications that are configured to implement a standard reliable data transmission protocol, such as the Transmission Control Protocol (TCP).

As is known in the art, the communication network 104 comprises a plurality of different components in different configurations depending on the implementation. For ease of explanation only, in the present embodiment the communication network 104 includes a WWAN 104a, a WLAN 104b, and a WAN 104c. The WWAN 104a is a cellular base station for communicating over a cellular network. As is known in the art, the cellular base station 104a provides a data packet service such as GSM-based High Speed Packet Access (HSPA). The WLAN 104b is a Wi-Fi access point. As is known in the art, the Wi-Fi access point 104b provides wireless communication based on the Institute of Electrical and Electronics Engineers (IEEE) 802.11 standards. The WAN 104c can be a Digital Subscriber Loop (DSL) or cable network, with connectivity provided by a modem and/or router 107 proximal to the wireless communication device 110.

It will be appreciated by a person of ordinary skill in the art that different network configurations can be used and different WWANs 104a and WLANs 104b could be available to the mobile communication device at the same time, depending on the implementation. Similarly, other WANs 104c, such as intranets or other known or proprietary network could also be available to the mobile communication device. The communication network 104 may also include a public network 120, such as the Internet for example, to facilitate communication between the WWANs 104a, WLANs 104b and WANs 104c.

Figure 2:
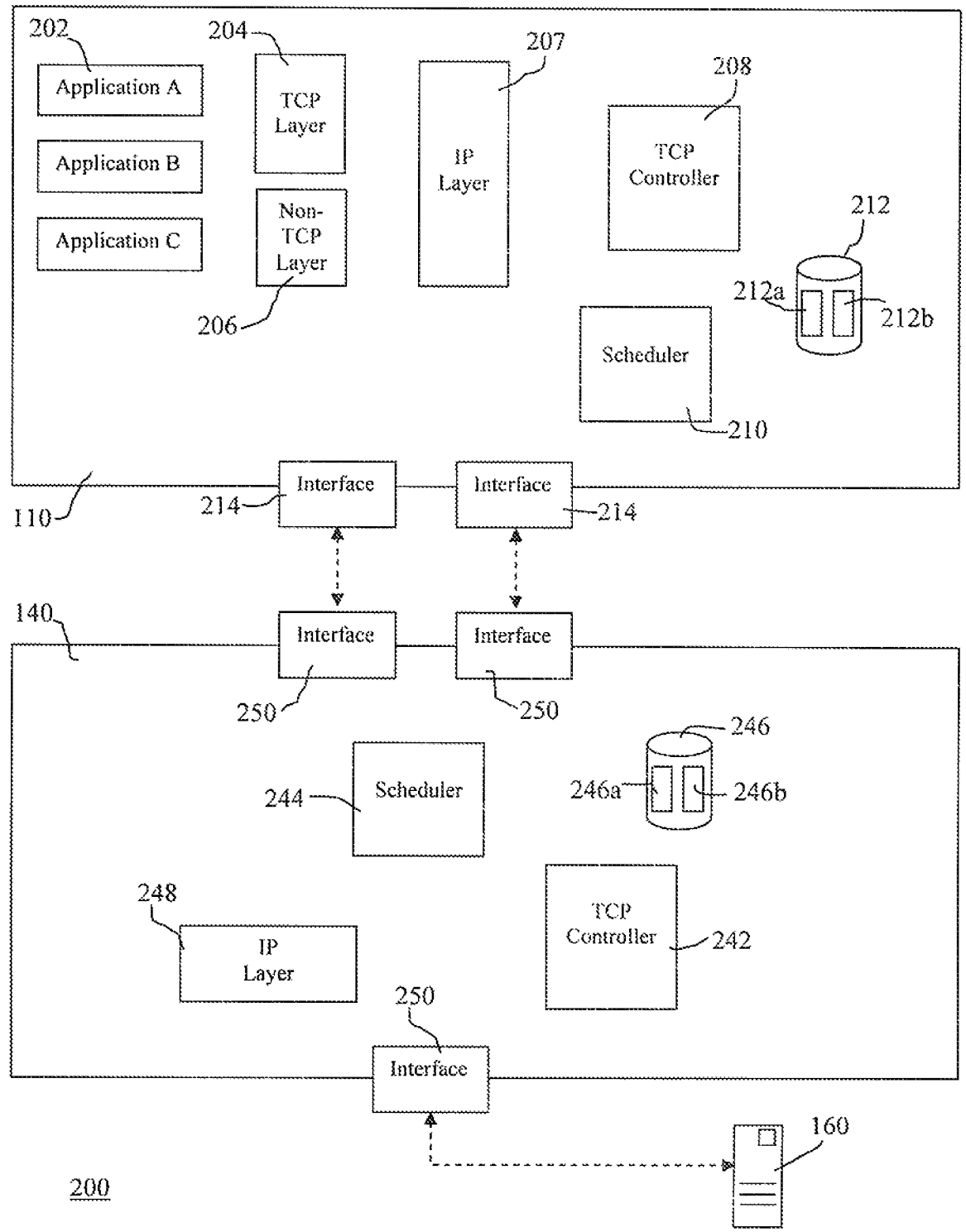
FIG. 2 is a more block diagram illustrating elements of the network in FIG. 1 in greater detail.

Referring to FIG. 2, a more detailed view of the mobile communication device 110 and the proxy server 140 shown in FIG. 1, is illustrated generally by numeral 200.

As shown, the mobile communication device 110 includes one or more applications 202, a TCP layer 204, a non-TCP layer 206, an Internet Protocol (IP) layer 207, a TCP controller 208, a scheduler 210, a buffer 212 and one or more communication interfaces 214. The buffer comprises a transmit buffer 212a and a receive buffer 212b. The communication interfaces 214 include an HSPA interface 214a and a Wi-Fi interface 214b. The TCP controller 208 is a client protocol controller that facilitates communicating with the applications 202 using one protocol and with the proxy server 140 using another protocol, as will be described.

The proxy server 140 includes a TCP controller 242, a scheduler 244, a buffer 246, an IP layer 248 and a plurality of interfaces 250. The buffer 246 includes a transmit buffer 246a and a receive buffer 246b. The TCP controller 242 is a server protocol controller that facilitates communicating with the mobile communication device 110 using one protocol and with the remote server 140 using another protocol, as will be described. The plurality of interfaces 250 may be virtual interfaces and the proxy server 140 may have as few as one physical interface to the communication network 104.

Each of the components of the mobile communication device 110 and the proxy server 140 are illustrated separately for ease of explanation. In practice, many of these components may be implemented together, as will be appreciated by a person of ordinary skill in the art. Thus, some of the functionality described below attributed to one of the components may actually be implemented by another one of the components. For example, some steps described as being performed by the TCP controller 208 may be also be performed by the scheduler 210, without detracting from the invention.

Figure 3:
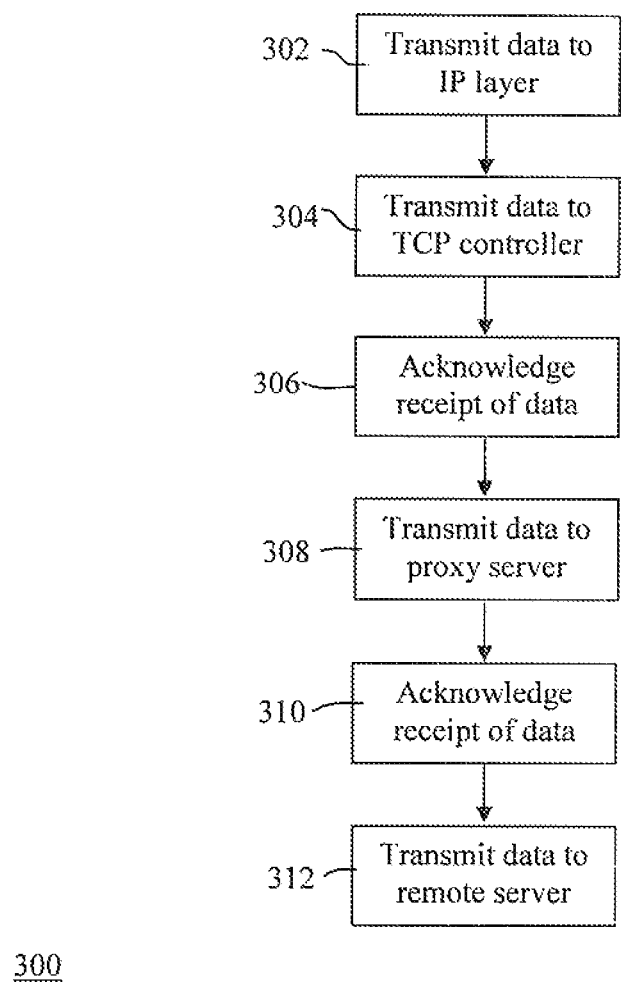
FIG. 3 is a flow chart illustrating the steps taken to transmit data from a mobile communication device to a remote server.

Referring to FIG. 3, a flow chart illustrating how data is communicated from the application 202 to the remote server 160 using TCP is shown generally by numeral 300. At step 302, the application 202 prepares to transmit data by segmenting it into IP packets as is standard in the art. That is, the application 202 transmits the data to the TCP layer 204 provided by the mobile communication device 110. The TCP layer 204 breaks the data into TCP segments and forwards each TCP segment to the IP layer 207. The IP layer 207 encapsulates each TCP segment into an IP packet by adding a header that includes a destination IP address.

At step 304, the IP layer 207 transmits the IP packet to the TCP controller 208 over a virtual interface. At step 306, the TCP controller 208 decapsulates the IP packet and stores the data in the transmit buffer 212a. The TCP controller 208 also sends a TCP acknowledgement signal (TCP ACK) back to the TCP layer 204 using the virtual interface. Accordingly, to the TCP layer 204 it appears as if the IP packet has been delivered to remote server 160, and the TCP layer 204 reacts as it normally would to a TCP acknowledgement signal (TCP ACK) from the remote server 160. At step 308, the scheduler 210 transmits data from the mobile communication device 110 to the proxy sever 140 based on a predefined scheduling algorithm. A communication protocol, referred to as the intermediary communication protocol, is used to transmit the data between the wireless communication device 110 and the proxy. The intermediary communication protocol is described later in the specification.

Transmission between the TCP layer 204 and the TCP controller 208 can be regulated using TCP flow control. That is, the TCP controller 208 can monitor the amount of data stored in the transmit buffer 212a and send buffer size advertisements accordingly. Thus, the TCP controller monitors the space available in the transmit buffer 212a and, when it reaches a predefined advertising threshold, starts sending buffer size advertisements. When the TCP layer 204 starts receiving the buffer size advertisements, it only transmits the amount of data specified in the advertisement and waits for a further update from the TCP controller 208 before sending more data. The buffer size advertisement can be set to zero when the amount of data in the transmit buffer 212a reaches a predefined hold threshold. The predefined hold threshold may be the maximum capacity of the transmit buffer 212a or a value lower than the maximum capacity of the transmit buffer 212a to limit overflow thereof.

While the TCP layer 204 has temporarily paused its transmission, the scheduler 210 continues to transmit the data to the proxy server 140. Accordingly, space available in the transmit buffer 212a will increase. Thus, the TCP controller 208 monitors the space available in the transmit buffer 212a and sends the buffer size advertisements accordingly. As the available space in the transmit buffer 212a increases, the transmission rate of data from the TCP layer 204 to the TCP controller 208 increases. The transmission rate increases until either the size of the buffer size advertisements decrease because the transmit buffer 212a is becoming full or a maximum transmission rate is reached.

Accordingly, the buffer size advertisements are used to control the amount of data stored in the transmit buffer 212a. Thus, the TCP controller 208 can "pull" a predefined number of data segments from the TCP layer 204 protocol by properly setting the buffer size advertisements until a maximum desired amount of data is buffered. Once the maximum desired amount of data is stored in the transmit buffer 212a, the buffer size advertisements can be set to zero and the TCP layer 204 stops sending data.

Because the TCP acknowledgement signal (TCP ACK) is received by the TCP layer before the actual TCP packet is received by the remote server 160, strictly speaking the proposed solution violates TCP semantics. However, in the present embodiment, the network 100 has been designed to minimize the practical affect of this violation. Thus, when the TCP controller 114 sends the TCP acknowledgement signal (TCP ACK) to the TCP layer, it takes over responsibility for the delivery thereof. In order to facilitate this feature, if it is desired to maintain the reliability of the TCP, the communication protocol used to transmit data between the wireless communication device 110 and the proxy server 140 includes, among others, a reliability mechanism.

Thus, at step 308 the scheduler 210 encapsulates the data from the transmit buffer 212a in accordance with the intermediary communication protocol and transmits the data to the proxy server 140 based on the predefined scheduling algorithm. In order to facilitate reliability, a copy of the data is kept in the transmit buffer 212a in case it does not arrive at the proxy server 140.

At step 310, upon receipt of the encapsulated data, the proxy server 140 decapsulates the data and stores it in the receive buffer 246b. The proxy server 140 also sends an acknowledgement to the mobile communication device 110. At step 312, upon receipt of the acknowledgement from the proxy server 140, the TCP controller 208 deletes the corresponding data from the transmit buffer 212a. The TCP controller 208 has fulfilled its obligation to ensure safe delivery of the IP packet to the proxy server 140. In turn, the proxy server 140 assumes responsibility for delivering the data to the remote server 160.

At step 312, the proxy server 140 transmits the data, stored in the receive buffer 246b, to the remote server 160 using standard TCP.

Accordingly, the network 100 effectively isolates the wired network, between the proxy server 140 and the remote server 160, where traditional TCP behaviour works well, and the wireless part of the network, between the mobile communication device 110 and the proxy server 140, where traditional TCP behaviour can be improved. Further, the network 100 masks the fact that data packets could be transmitted over a plurality of different communication networks 104. For example, as will be described, communication between the applications 202 and the TCP controller 208 occurs using TCP. Similarly, communication between the remote server 160 and the proxy server 140 occurs using TCP. This configuration effectively removes the requirement to use TCP as the intermediary communication protocol. This allows a new, improved protocol to be developed that can take into consideration the fact that the data packets are being transmitted over multiple different communication networks 104. Since the new protocol can be design specifically for this purpose, it is anticipated that the communication between the mobile communication device 110 and the proxy server 140 can be made more efficient.

If it is required, or desired, to meet the reliability guarantees of TCP, the reliability protocol should be capable of acknowledging and retransmitting data packets when necessary. To better deal with issues related to mobile communication, the new protocol should also use mechanisms to distinguish between data packet losses due to congestion and data packet losses due to wireless problems. Example of such mechanisms can be found in TCP Westwood, described in detail in Saverio Mascolo, Claudio Casetti, Mario Gerla, M. Y. Sanadidi, and Ren Wang, "TCP Westwood: Bandwidth estimation for enhanced transport over wireless links", International Conference on Mobile Computing and Networking, 2001, as well as in TCP Westwood+, described in detail in Luigi Alfredo Grieco and Saverio Mascolo, "End-to-End Bandwidth Estimation for Congestion Control in Packet Networks", 2003. A congestion control mechanism should also be used, and it should be verified that it does not negatively affect other existing TCP flows in the network beyond the level regular TCP flows affect other TCP flows. Further, the new protocol needs to be integrated with the parts of the scheduler 210 that transmit all other, not-TCP, IP packet types.

The intermediary communication protocol can be an entirely new communication protocol or it could be developed as an extension of existing protocols. For example it can be based on TCP, Stream Control Transmission Protocol (SCTP), User Datagram Protocol (UDP) or other known or proprietary protocols. In the present embodiment, the intermediary communication protocol uses UDP as the transport protocol. However, custom headers are added for control and to meet the reliability guarantees.

However, it should be noted that the details of the communication protocol for transmitting data between the mobile communication device 110 and the proxy server 140 are beyond the scope of the present invention. Any number of known or proprietary communication protocols can be used with varying degrees of success without detracting from the present invention as claimed.

As described above, at a client side, TCP is used to communicate between the application 202 on a mobile communication device 110 and the TCP controller 208 on the same mobile communication device 110. At a server side, TCP is used to communicate between the proxy server 140 and the remote server 160. The proxy server 140 and the mobile communication device 110 are free to communicate using the intermediary transmission protocol, be it a new protocol or a modification to an existing protocol, transparent to both the application 202 and the remote server 106. This embodiment is particularly useful for many legacy remote servers 106 that use, and will continue to use, TCP as the reliable protocol of choice. However, depending on the selection of the protocol used to communicate between the mobile communication device 110 and the proxy server 140, as well as the capability of the remote server 160, it may not be necessary for the proxy server 140 to assume responsibility for the transmission of the data.

For example, if the intermediary communication protocol is a TCP-based protocol it may be possible for the proxy server 140 to route the IP packets to the remote server 160, without assuming responsibility for the transmission. That is, the client side use of TCP to communicate between the application 202 on the mobile communication device 110 and the TCP controller 208 on the same mobile communication device 110 would remain. However, the TCP controller 208 would use a TCP based communication protocol to communicate with the remote server 160 using the proxy server 140 as an intermediary. The remote server 160 would transmit the acknowledgement message ACK to the TCP controller 208, via the proxy server 140. However, in this example, the proxy server 140 acts only as an intermediate node and takes no responsibility for delivering any IP packets it receives.

As another example, the intermediary communication protocol is non-TCP based and the remote server 160 is modified to communicate using a protocol compatible with it, then it may be possible for the proxy server 140 to route the IP packets to the remote server 160, without assuming responsibility for the transmission. Similarly to the previous example, the client side use of TCP to communicate between the application 202 on the wireless communication device 110 and the TCP controller 208 on the same mobile communication device 110 would remain. However, the TCP controller 208 would use a non-TCP based communication protocol to communicate with the remote server 160 using the proxy server 140 as an intermediary. The remote server 160 would transmit an acknowledgement message, as defined by the new communication protocol, to the TCP controller 208, via the proxy server 140. Thus, in this example, the proxy server 140 acts only as an intermediate node and takes no responsibility for delivering any packets it receives.

In both of the examples described above, the proxy server 140 may not be required at all, depending on the implementation.

Figure 4:
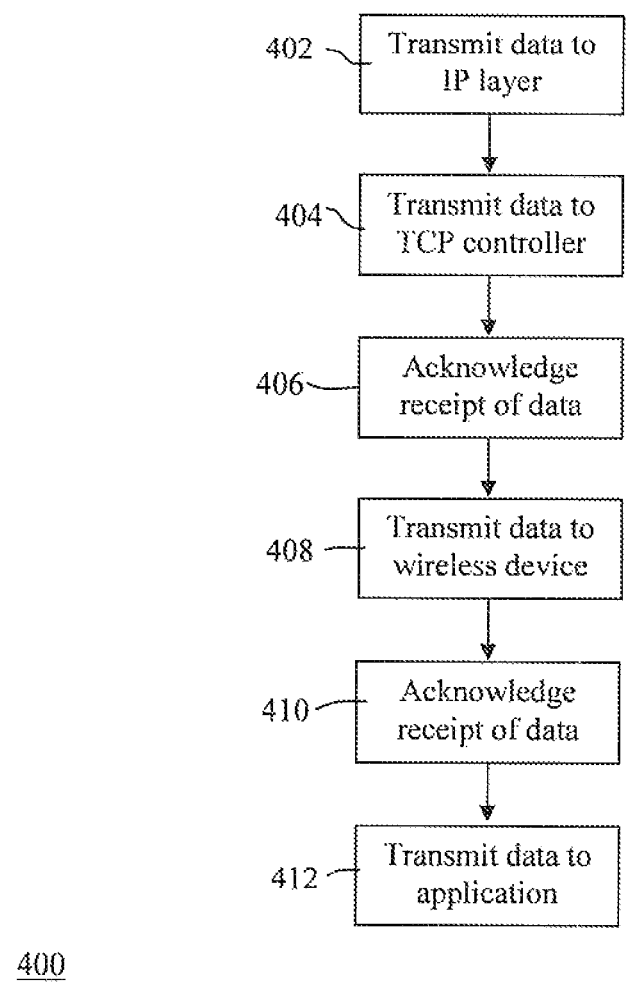
FIG. 4 is a is a flow chart illustrating the steps taken to transmit data from the remote server to the mobile communication device.

Referring to FIG. 4, a flow chart illustrating how data is communicated from the remote server 160 to the application 202 using TCP is shown generally by numeral 400. At step 402, the remote server 160 prepares to transmit data by segmenting it into IP packets as is standard in the art. That is, the remote server 160 transmits the data to the TCP layer (not shown), which breaks the data into TCP segments and forwards each TCP segment to the IP layer (not shown). The IP layer encapsulates each TCP segment into an IP packet by adding a header that includes a destination IP address.

At step 404, the IP layer at the remote server 160 transmits the IP packet to the TCP controller 242 at the proxy server 140, via the communication network 104. Usually, the transmission is across a wired portion of the communication network 104 At step 406, the TCP controller 242 decapsulates the TCP packet from the IP packet and decapsulates the data from the TCP packet. The decapsulated data is stored in the transmit buffer 246a and a TCP acknowledgement packet (TCP ACK) is sent to the remote server 160. Accordingly, to the remote server 160 it appears as if the TCP packet has been delivered to mobile communication device 110, and the remote server 160 reacts as it normally would to a TCP acknowledgement packet (TCP ACK).

At step 408, the scheduler 244 transmits data from the proxy server 140 to the mobile communication device 110 based on a predefined scheduling algorithm. The scheduling algorithm executing on the scheduler 244 at the proxy server 140 may or may not be the same as the scheduling algorithm executing on the scheduler 210 at the mobile communication device 110. In order to facilitate reliability, a copy of the data is kept in the transmit buffer 246a in case it does not arrive at the mobile communication device 110.

At step 410, upon receipt of the IP packet, the mobile communication device 110 stores it in the receive buffer 212b and sends an acknowledgement signal ACK to the proxy server 240. At step 412, upon receipt of the acknowledgement signal ACK from mobile communication device, the TCP controller 242 deletes the corresponding data from the transmit buffer 246a. The TCP controller 242 has fulfilled its obligation to ensure safe delivery of the data to the mobile communication device. In turn, the TCP controller 208 at the mobile communication device 110 assumes responsibility for delivering the data to the application 202.

At step 412, the TCP controller 208 can transmit the data, stored in the receive buffer 212b, to the application 202 using standard TCP.

Accordingly, by implementing the system using one of the embodiments described above, it is possible not only to use an improved TCP algorithm that better reacts to data packet losses related to wireless issues, but to use a completely different protocol which is designed to handle multiple interfaces and wireless packet losses explicitly.

Further, although the embodiments described above specifically recite TCP as the communication protocol, the invention may be applicable to other protocols in which the reliability mechanism reacts poorly to wireless transfer of data and to transfer of data over multiple communication interfaces.

In accordance with an alternate embodiment, the TCP controller 208, buffer 212 and scheduler 210 can be implemented on a separate device from the mobile communication device 110. For example, they could be implemented on a router or modem external to, but on the same side of the communication network 104 as, the mobile communication device 110.

Using the foregoing specification, the invention may be implemented as a machine, process or article of manufacture by using standard programming and/or engineering techniques to produce programming software, firmware, hardware or any combination thereof.

Any resulting program(s), having computer-readable instructions, may be stored within one or more computer-usable media such as memory devices or transmitting devices, thereby making a computer program product or article of manufacture according to the invention. As such, the terms "software" and "application" as used herein are intended to encompass a computer program existent as instructions on any computer-readable medium such as on any memory device or in any transmitting device, that are to be executed by a processor.

Examples of memory devices include, hard disk drives, diskettes, optical disks, magnetic tape, semiconductor memories such as FLASH, RAM, ROM, PROMS, and the like. Examples of networks include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, for example, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

Using the description provided herein, those skilled in the art will be readily able to combine software created as described with appropriate general purpose or special purpose computer hardware to create a computer system and/or computer subcomponents embodying the invention, and to create a computer system and/or computer subcomponents for carrying out the method of the invention.

Although preferred embodiments of the invention have been described herein, it will be understood by those skilled in the art that variations and combinations may be made thereto without departing from the scope of the appended claims.

What is claimed is:

1. A mobile communication device configured to transmit data to a remote server, the mobile communication device comprising:
    a wireless communication interface for communicating across a wireless network;
    a processor for executing non-transitory computer-readable instructions; and
    memory for storing the non-transitory computer-readable instructions, the nontransitory computer-readable instructions operable to:
        receive first data packets from an application executing on the mobile communication device using a first communication protocol;
        falsely indicate to the application, receipt of the first data packets by the remote server, by acknowledging receipt of the first data packets via a client protocol controller using the first communication protocol, prior to transmitting the data packets across the wireless network;
        decapsulate the first data packets to obtain decapsulated data; and
        transmit the decapsulated data from the mobile communication device to the remote server using an intermediary communication protocol different from the first communication protocol,
        wherein the decapsulated data is transmitted using second data packets with a packet type different from the first data packets, and
        wherein the intermediary communication protocol and the first communication protocol are different transport protocols.

2. The mobile communication device of claim 1, wherein the intermediary communication protocol is customized for the wireless network.

3. The mobile communication device of claim 1, further comprising a plurality of communication interfaces for transmitting the decapsulated data in parallel, each communication interface configured to transmit a part of the decapsulated data across a different network path.

4. The mobile communication device of claim 3, wherein the intermediary communication protocol is configured for transmitting the parts of the decapsulated data simultaneously via the plurality of communication interfaces.

5. The mobile communication device of claim 1, wherein the intermediary communication protocol is a reliable transmission protocol.

6. The mobile communication device of claim 1, wherein the client protocol controller is implemented on the mobile communication device.

7. The mobile communication device of claim 1, wherein the client protocol controller is implemented on a client-side device and an acknowledgment message is transmitted to the mobile communication device to acknowledge receipt of the first data packets.

8. A method for transmitting data from a mobile communication device to a remote server across a wireless network, the method comprising the steps of:
    receiving first data packets from an application executing on the mobile communication device using a first communication protocol;
    falsely indicating to the application, receipt of the first data packets by the remote server, by acknowledging receipt of the first data packets via a client protocol controller using the first communication protocol, prior to transmitting the data across the wireless network;
    decapsulating the first data packets to obtain decapsulated data; and
    transmitting the decapsulated data from the mobile communication device to the remote server using an intermediary communication protocol,
    wherein the decapsulated data is transmitted using second data packets with a packet type different from the first data packets, and
    wherein the intermediary communication protocol and the first communication protocol are different transport protocols.

9. The method of claim 8, wherein the intermediary communication protocol is customized for the wireless network.

10. The method of claim 8, wherein the decapsulated data are transmitted in parallel across a plurality of communication interfaces, each of the plurality of communication interfaces configured to transmit a part of the decapsulated data across a different network path.

11. The method of claim 10, wherein the intermediary communication protocol is configured for transmitting the parts of the decapsulated data simultaneously via the plurality of communication interfaces.

12. The method of claim 8, wherein the intermediary communication protocol is a reliable transmission protocol.

13. The method of claim 8, wherein the step of transmitting the decapsulated data from the mobile communication device to the remote server comprises transmitting the decapsulated data to a proxy server using the intermediary communication protocol and transmitting the decapsulated data from the proxy server to the remote server using a predefined reliable protocol.

14. The method of claim 13, wherein the predefined reliable protocol is the first communication protocol.

15. The method of claim 14, wherein the first communication protocol is the Transmission Control Protocol (TCP).

16. The method of claim 8 wherein the step of acknowledging receipt of the first data packets is performed by the mobile communication device.

17. The method of claim 8, wherein the step of acknowledging receipt of the first data packets is performed by a client-side device in communication with the mobile communication device.

18. The method of claim 8,
wherein the step of transmitting the decapsulated data from the mobile device to the remote server comprises transmitting the decapsulated data to a proxy server,
wherein the proxy server comprises a first communication interface corresponding to a first network path between the mobile device and the proxy server and a second communication interface corresponding to a second network path different from the first network path, and
wherein the intermediary communication protocol communicates with the proxy server by transmitting packets over the first network path.

19. The method of claim 18,
wherein the intermediary communication protocol and the first communication protocol operate on the first network path and the second network path, respectively.

* * * * *